United States Patent
Heck et al.

[11] 3,730,301
[45] May 1, 1973

[54] TEMPERATURE RESPONSIVE PUMP DRIVE MECHANISM

[75] Inventors: Burnette Heck, Bloomfield Hills; Donald W. Reynolds, Detroit, both of Mich.

[73] Assignee: General Motors Corporation, Detroit, Mich.

[22] Filed: Sept. 15, 1971

[21] Appl. No.: 180,806

[52] U.S. Cl. ............ 188/71.6, 188/264 P, 192/70.12, 192/113 B
[51] Int. Cl. .............................................. F16d 65/84
[58] Field of Search ....................... 188/71.6, 264 P, 188/264 E; 192/113 B, 70.12

[56] References Cited

UNITED STATES PATENTS

| 3,071,210 | 1/1963 | Wrigley et al. | 188/264 E X |
| 3,580,368 | 5/1971 | Heck | 188/264 P |

*Primary Examiner*—George F. A. Halvosa
*Attorney*—W. E. Finken et al.

[57] ABSTRACT

A liquid cooled disk brake includes a series of friction disks splined to the rotating wheel hub and interleaved rotationally stationary friction disks splined to the brake housing, one of the stationary disks being replaced by a gear rotatable with respect to both the brake housing and the hub and positioned between two of the rotating disks for rotation therewith to drive a brake coolant circulating pump when the disk pack is compressed for braking the rotation of the wheel. A temperature responsive bimetallic clip engages the two stationary disks adjacent the two rotating disks juxtaposed to the pump drive disk and forces the rotating disks into clutching engagement with the pump drive disk to drive the coolant pump irrespective of disk pack actuation when the temperature exceeds a predetermined level.

1 Claim, 1 Drawing Figure

Patented May 1, 1973 3,730,301
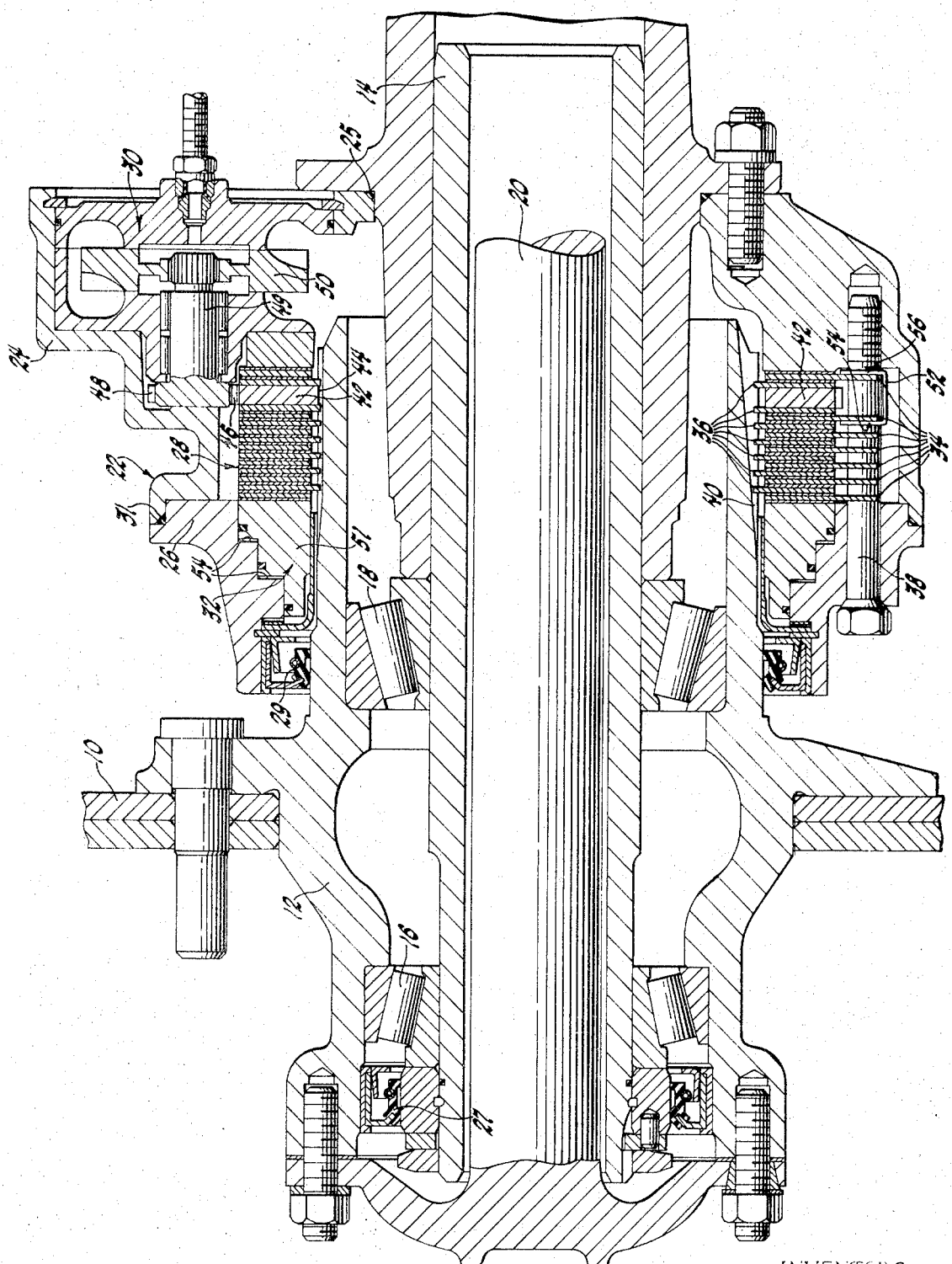
INVENTORS
Burnette Heck &
BY Donald W. Reynolds
D.D. McGraw
ATTORNEY

TEMPERATURE RESPONSIVE PUMP DRIVE MECHANISM

BACKGROUND OF THE INVENTION

The invention relates to a pump drive mechanism and more particularly to one which utilizes the disk pack of a liquid cooled disk brake to drive a brake coolant circulating pump when the brake is actuated and includes a temperature responsive bimetallic element to compress a portion of the disk pack for driving the pump when the brake is not actuated but still requires pump operation for coolant circulation.

United States Pat. No. 3,580,368 provides a pump drive mechanism for a liquid cooled disk brake utilizing the disk pack to provide a high speed drive while the brake is actuated and a low speed drive through viscous shear action of the coolant between the disks when the brake is released. After the brake is released, while the coolant and disk pack are still hot and continued coolant flow s desirable, the low viscous drag of the hot coolant results in a relatively low driving torque imparted to the pump. The present invention provides a temperature responsive bimetallic clip which actuates a portion of the disk pack to drive the pump and thereby provide coolant flow.

BRIEF SUMMARY OF THE INVENTION

In the liquid cooled disk brake, a series of annular disks are splined to the rotating hub and have interleaved therebetween a similar series of stationary disks splined to the stationary brake housing. One of the stationary disks is replaced by an annular gear which is rotatable on the hub and meshes with a pump impeller drive gear in turn connected to a pump impeller. When the disk pack is compressed for braking, the two rotating disks grip the pump drive disk in a clutching manner causing it to rotate with the wheel and hub and thereby drive the coolant pump.

A temperature responsive bimetallic clip is mounted with the stationary disks and arranged in juxtaposed relation with the two stationary disks adjacent the two rotatable disks which surround the pump drive disk. Whenever the temperature exceeds a predetermined level, the bimetallic clip imparts an axial force to the stationary plates causing the two rotatable disks to clutch the pump disk imparting thereto a pump driving torque. When the coolant flow has reduced the temperature to below the predetermined level, the bimetallic clip imparts no load to the disks and in fact allows clearance therebetween so that the cooling liquid pump does not take any power from the wheel when coolant circulation is no longer needed.

BRIEF SUMMARY OF THE DRAWINGS

The objects and advantages of the invention will become apparent upon examination of the following specification and the single drawing showing a cross-section view of a vehicle liquid cooled disk brake having a pump drive mechanism embodying the invention and having parts broken away and in section.

DESCRIPTION OF THE PREFERRED EMBODIMENT

The vehicle wheel 10 is mounted on a hub 12 which is in turn rotatably mounted on an axle housing 14 by means of bearings 16 and 18. The hub 12 is connected to the rear axle 20 for rotation therewith. Alternatively, the hub 12 may be rotatably mounted by bearings 16 and 18 on the wheel spindle of a steering knuckle for a front wheel application of the invention. A brake housing 22 including an inner portion 24 and an outer portion 26 is suitably mounted on the rear axle housing 14 so that it is stationary relative the rotating hub 12. The housing 22 contains a brake disk pack 28, a coolant circulating pump assembly 30, and a brake actuating mechanism 32. The brake housing 22 is sealed to prevent coolant leakage by seals 25, 27, 29 and 31.

The disk pack 28 includes a series of stationary braking disks 34 interleaved with a similar series of rotatable braking disks 36. The disks 34 are held against rotation in a spline-like manner by fitting about housing bolts 38 which are spaced circumferentially about housing 22. The rotatable disks 36 have splines on their inner peripheries which mate with splines 40 on the hub 12. Thus, the rotatable disks 36 and the stationary disks 34 are axially movable when the brake is energized and released. A pump drive disk 42 is positioned between two adjacent rotatable disks 36 so that when the disk pack is compressed, the rotatable disks will engage the drive disk 42 in a clutch-like manner, causing the drive disk 42 to be rotated with the rotatable disks 36, the hub 12, and the wheel 10.

The inner periphery 44 of pump drive disk 42 fits about the outer face of the hub splines 40 to provide a bearing and guiding arrangement for the pump drive disk 42. The outer periphery of the disk 42 is provided with gear teeth 46 which mesh with the pump drive gear 48. Pump drive gear 48 has a shaft 49 journaled in a portion of the housing 22 providing a pump assembly housing and is connected to the pump impeller 50 so as to drive that impeller when the pump drive disk 42 is rotated.

The brake actuating mechanism 32 includes a piston 51 which is sealingly slidable in housing 22, forming therewith a chamber 54. Hydraulic brake pressure is communicated to chamber 54 when the brakes are to be actuated, thus moving piston 52 to compress the disk pack 28. Compression of disk pack 28 forces the interleaved annular disks 34 and 36 into frictional engagement with one another, thus impeding rotation of the rotating disks 36, hub 12 and wheel 10. Pump drive disk 42 is clutched in friction driving relation between the rotatable disks 36 juxtaposed thereto and consequently rotates at the wheel speed to drive the coolant circulating pump 30.

When the disk pack is released, the rotatable disks 36 no longer forcibly engage the pump drive disk 42 in friction driving relation. However, since the space between the rotatable disks 36 and the pump drive disk 42 is filled with coolant, there is a viscous shear drive action through the coolant located between the rotating disks and the pump drive disk 42. This viscous shear drives the pump drive disk 42 and the pump impeller 50 geared thereto at a much lower speed than during disk pack energization. The friction surfaces of the drive disk 42 and/or the friction surfaces of the adjacent rotatable disks 36 can be designed to provide the viscous shear drive effect needed to drive the pump impeller at the desired speed in relation to the vehicle wheel speed.

A temperature responsive element in the form of a bimetallic clip 52 is provided to insure continued circulation of the coolant fluid subsequent to brake energization until such time as the coolant and brake are sufficiently cooled to require only the viscous shear drive for the pump. The bimetallic clip 52 is mounted on housing bolt 38 and includes generally parallel legs 54 and 56 which extend in juxtaposed relation to the face of the stationary braking disks 34 on either side of the rotatable disks 36 which are located on either side of pump drive disk 42. When the temperature of the bimetallic clip 52 is less than a predetermined level, the legs 54 and 56 of the bimetallic clip 52 permit clearance between the brake disks surrounding the pump drive disk 42. At temperatures above the predetermined level, thermal expansion of the bimetallic clip causes the legs 54 and 56 to engage the stationary disks 34 forcing them into engagement with the rotatable disks 36 which in turn engage the pump drive disk 42 to drive the coolant circulating pump assembly 30. Preferably, several clips 52 are spaced circumferentially about the disk pack to insure even force application. The axial force imparted to the disks by the clips 52 is not of such a magnitude as to result in an appreciable braking of the wheel speed. The force with which the legs 54 and 56 engage the disks is proportional to the temperature and thus the degree of slippage between the rotatable disks and the pump drive disk and consequently the speed of the pump is proportional to the temperature. The temperature of the bimetallic clip is of course a function of the rate of heat transfer between it and disks 34, bolt 38 and the coolant. It is thus apparent that the bimetallic clip 54 may be designed to provide the desired degree of coolant circulation when the viscous shear drive of the pump mechanism does not provide for adequate cooling of the brake after brake release.

What is claimed is:

1. A pump drive comprising:
   a plurality of rotatable disks to be braked;
   a plurality of rotationally stationary disks interleaved with the rotatable disks to form a disk pack;
   means for selectively compressing the disk pack to brake the rotatable disks and for releasing the disk pack to permit rotation of the rotatable disks relative to the stationary disks;
   a pump drive disk having opposed side friction surfaces and a drive gear formed thereon and being positioned between and frictionally engageable with two of the rotatable disks, said pump drive disk being clutched in driving relation with the two rotatable disks when the disk pack is compressed;
   a driven gear in mesh with the drive gear and operatively driving a pump when the drive gear is rotated;
   and a clip mounted with the rotationally stationary disks and having legs extending adjacent the two stationary disks juxtaposed to the two rotatable disks and on the sides thereof opposite the pump drive disk, the clip being formed of a bimetallic temperature responsive material and above a predetermined temperature the legs forcibly engaging the two stationary disks to clutch the pump drive disk between the two rotatable disks to drive the pump at a speed proportional to the temperature.

* * * * *